United States Patent

[11] 3,589,621

[72] Inventor Richard C. Bradley
   Fort Lauderdale, Fla.
[21] Appl. No. 803,339
[22] Filed Feb. 28, 1969
[45] Patented June 29, 1971
[73] Assignee Ransburg Electro-Coating Corp.
   Indianapolis, Ind.

[54] SPRAY DEVICE
   5 Claims, 3 Drawing Figs.
[52] U.S. Cl. .................................................. 239/526,
   239/527, 239/583, 239/412
[51] Int. Cl. ...................................................... B05b 7/02
[50] Field of Search ......................................... 239/525,
   526, 527, 583, 15, 412

[56] References Cited
   UNITED STATES PATENTS
| | | | |
|---|---|---|---|
| 1,380,866 | 6/1907 | Day .............................. | 239/526 |
| 1,969,205 | 8/1934 | Carr et al. ..................... | 239/526 |
| 2,991,940 | 7/1961 | Dupler et al. ................. | 239/527 |
| 3,033,472 | 5/1962 | Sheldon ......................... | 239/527 |

Primary Examiner—M. Henson Wood, Jr.
Assistant Examiner—Edwin D. Grant
Attorney—Johnson, Downer, Badger & Hoffmann ABSTRACT: A valve assembly for a spray gun which controls the flow of a fluid from a fluid source to a fluid-actuated means. The valve assembly includes a valve sleeve having a gasket seat at opposite ends thereof. First and second movable gasket means are cooperatively associated with each gasket seat. The valve sleeve and the gasket means cooperate to define a chamber which is connected to a fluid-actuated means. An actuator is adjacent a means carrying the gasket means for moving either the first or the second gasket means into engagement with the cooperatively associated gasket seat thereby either connecting the fluid-actuated means causing displacement of the fluid-actuated means and flow of coating material from the coating material source or disconnecting the fluid source from the fluid-actuated means and allowing the fluid in the fluid-actuated means to exhaust therefrom through the gasket means removed from the gasket seat causing displacement of the fluid-actuated means and terminating the flow of coating material from the coating material source.

PATENTED JUN29 1971

INVENTOR
RICHARD C. BRADLEY

INVENTOR
RICHARD C. BRADLEY

SPRAY DEVICE

The present invention relates to an air-assisted trigger means for a spray gun. More particularly, the present invention relates to a valve means which assists in the displacement of a slidable shaft cooperatively associated with an orifice of a nozzle of an airless spray gun.

In airless spraying of coating materials such as paints and the like, atomization of the coating material may be accomplished by the substantially instantaneous release of forces exerted on the coating material upon emission thereof from the orifice of the gun. If the coating material contains a solvent, there may be a tendency for the solvent to vaporize thus affecting a finer atomization of the coating material upon emission thereof from the nozzle of the airless spray gun.

Generally, the pressure maintained on the coating material while flowing through the airless gun is from about 300 to about 600 p.s.i. A shaft having an extremity of suitable configuration may be used to close the orifice of the airless spray gun during the period of time the gun is deactuated. In order to maintain the orifice of the airless spray gun closed during the period of time the gun is not actuated, the extremity of the shaft is biased into mating engagement with the sidewall of the orifice by a bias means exerting a force on the shaft sufficient to urge it into mating engagement with the sidewall of the orifice. Therefore, in order for an operator to displace the extremity of the shaft from mating engagement with the sidewall of orifice so as to open the orifice so that the coating material may flow therethrough, the operator must exert a strong pulling force in order to displace the extremity of the shaft from mating engagement with the orifice of the nozzle.

A mechanical advantage may be used to assist in the task of displacing the shaft from the orifice. The mechanical advantage may be achieved by providing a pivotal trigger for displacing the shaft which has a length of about several inches. In airless spray guns using a pivotal trigger, the mechanical advantage realized reduces the pull force required to displace the shaft from the orifice to about 15 pounds. The trigger of the airless gun may be additionally lengthened to thereby provide a greater mechanical advantage which further reduces the pull force required by the operator to displace the shaft; however, the length of the handle and of the trigger of the airless spray gun is unusually long and bulky making handling of the airless spray gun cumbersome. The exertion of about 15 pounds of pull force by the operator during the spraying operation tends to result in operator fatigue and the problems associated with operator fatigue.

Another disadvantage of several of the prior art airless spray guns is that unless the operator of the gun possesses strong hands, he may be unable to cause withdrawal of the shaft from the orifice rapidly enough so as to obtain the desired spray pattern during the initial phase of the spraying operation. If the shaft is not rapidly withdrawn from mating engagement with the sidewall of the orifice, the initial spray stream may be somewhat like the spray stream emitted from a water pistol. A further withdrawal of the shaft from the vicinity of the orifice may cause a hornlike pattern to be emitted from the orifice of the airless gun. About 1 to about 2 seconds after operator actuation of the trigger, the airless gun emits the desired spray pattern from its orifice. The initial spray patterns are objectionable for, among other things, the patterns show an undesirable accumulation of the coating material on the article to be coated. In addition, the accumulation of coating material on the article over that necessary to satisfactorily coat the article results in a waste of the coating material. Furthermore, the accumulation of coating material may be so great that runs or streaks in the coating material may be so great that runs or streaks in the coating material may be observed visually. In the situation where runs in the coating material may be observed, the article may have to be reworked thereby burdening the manufacturer with an additional manufacturing cost.

Therefore, it is an object of the present invention to provide a spray gun which overcomes the above-mentioned problems.

Another object of the present invention is to provide an air-assisted trigger means for an airless spray gun.

Yet another object of the present invention is to provide an air-assisted trigger means for an airless spray gun which permits substantially instantaneous withdrawal of a shaft from mating engagement with the sidewall of an orifice thereby opening the orifice so that the desired spray-painting pattern may be realized substantially immediately after actuation of the air-assisted trigger.

A further object of the present invention is to provide an air-assisted trigger means for an airless spray gun which reduces operator fatigue.

Another object of the present invention is to provide an air-assisted trigger means for an airless spray gun actuation of which causes a fluid-actuated means to be displaced by a fluid to thereby cause the airless spray gun to emit a desired spray pattern.

Yet another object of the present invention is to provide a trigger means including a valve assembly cooperatively associated with a fluid-actuated means, the valve assembly capable of controlling the flow of a fluid from a fluid source to the fluid-actuated means.

A further object of the present invention is to provide an air-assisted trigger means for an airless spray gun including a valve assembly comprising a valve stem having a plurality of slots formed therein which may be used to exhaust a fluid from a fluid-actuated means cooperatively associated with air-assisted trigger means of the airless spray gun upon termination of a coating cycle.

Another object of the present invention is to provide an air-assisted trigger means for an airless spray gun which includes a valve assembly having gasket seats at opposite extremities of a valve sleeve.

Yet another object of the present invention is to provide an air-assisted trigger means for an airless spray gun which exhausts air at the trigger upon termination of a coating cycle.

A further object of the present invention is to provide an air-assisted trigger means for an airless spray gun which includes a valve assembly having low mass thereby facilitating displacement thereof and fabricated from a minimum number of parts.

With the aforementioned objects enumerated, other objects will be apparent from reading the following description and appended claims:

Generally speaking, the present invention relates to a spray gun which is suitable for dispensing a coating material onto an article of manufacture. The spray gun includes a gun body, a nozzle through which coating material is dispensed and an air-assisted trigger means.

Figure 1:
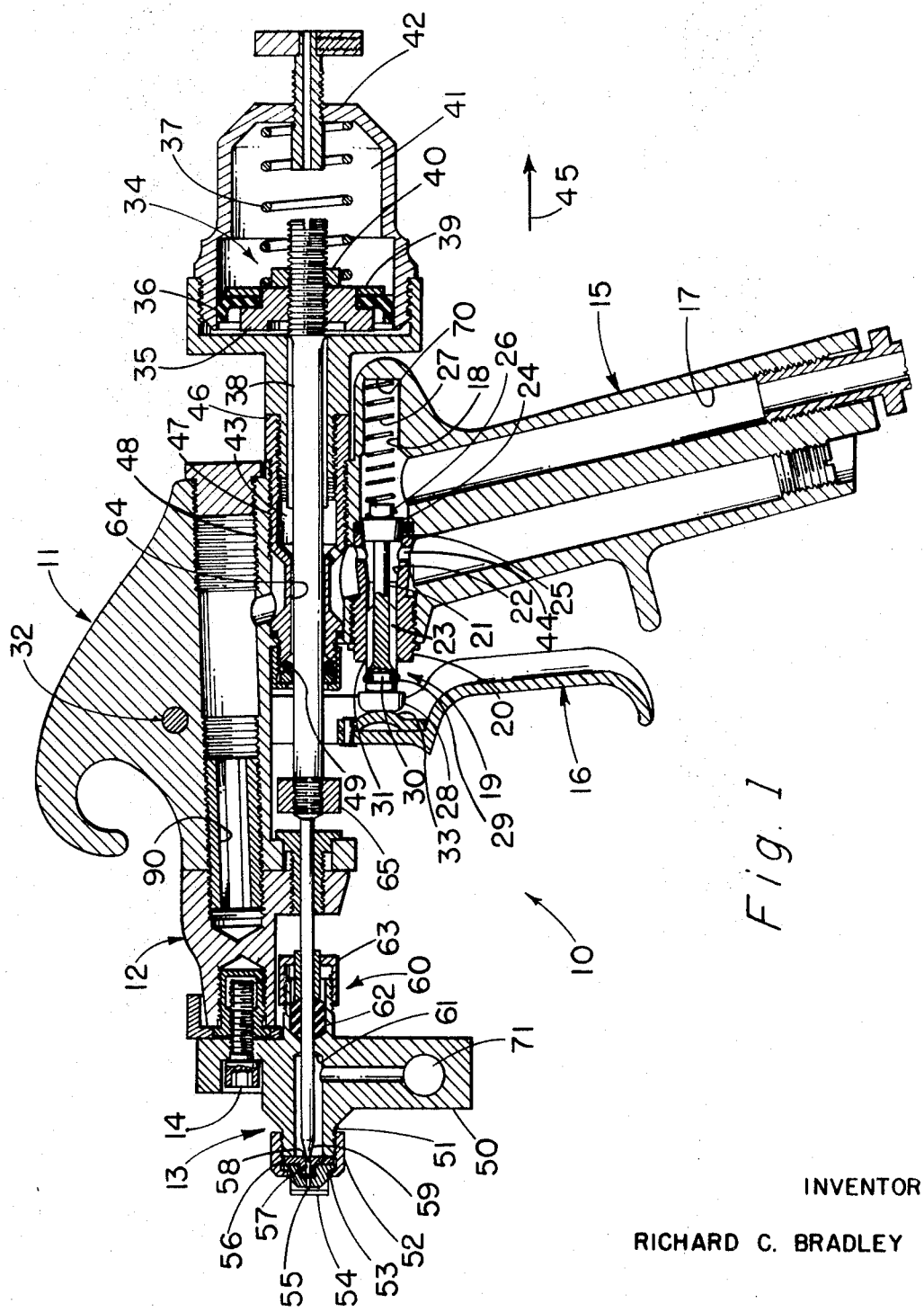
FIG. 1 is a cross-sectional view of an airless gun embodying the air-assisted trigger means of the present invention.
Figure 2:
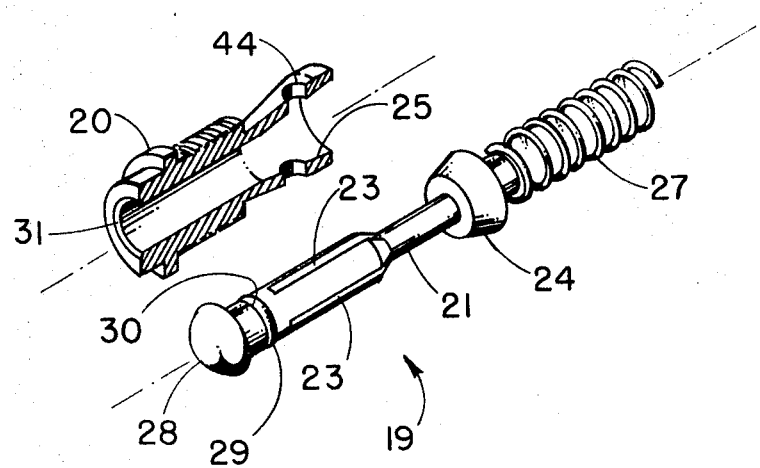
FIG. 2 is a perspective view of the valve assembly cooperatively associated with the trigger of the airless spray gun.

Referring now to FIG. 1 of the drawing, the airless spray gun is generally indicated by the reference numeral 10. The airless spray gun 10 may include a main body section 11, a head section 12, a nozzle section 13, a handle section 15 and a trigger 16.

The various sections of the airless gun may be maintained in abutting relationship by any suitable means such as by threads of one section threadly received by the threads of an adjacent section, by the use of threaded bolts threadly received by threaded nuts or by threaded apertures and the like. For example, threaded bolt 14 may be used to couple the nozzle section 13 to the head section 15 of the airless gun. An externally threaded hollow hexagonal nut 90 may be used, in the manner shown in FIG. 1, to connect the head section 12 to the body section 11 of the airless gun. Where necessary, it is to be understood that the joints between adjacent sections of the airless gun may be sealed by suitable gasket means so as to substantially prevent the escape of air and/or of coating material from the gun.

As shown in FIG. 1, the handle section 15 of the airless gun may include an air entry passage 17 which extends the length of the handle. One end of the air passage 17 may be connected to a suitable source of air pressure (not shown) by any suitable air conduit means (not shown) such as flexible hose and the like.

A valve chamber 18 may be provided in the body section 11 of the airless gun. The valve chamber 18 extends through a substantial length of the body section 11 and projects through the periphery of the body section as shown in FIG. 1. The valve chamber 18 is formed so as to communicate directly with the air entry passage 17 so that air in the air entry passage 17 is capable of at least flowing into a portion of the valve chamber 18 when the airless gun is connected to a source of air.

An air valve means 19 is seated in about the forward one-half of the valve chamber 18 as illustrated in FIG. 1. The air valve means 19 may include a valve sleeve 20 fixedly retained in the body section 11 of the airless gun by the mating engagement of the external threads of the valve sleeve with the threads formed in the wall of the valve chamber 18. A valve stem 21 is slidably positioned in chamber 22 provided by the valve sleeve 20. The clearance between the sidewall of the valve stem 21 and the sidewall of the chamber 22 is such that the valve stem may slide therein without harmfully binding with the valve sleeve. The valve stem 21 may include a plurality of slots 23 formed therein which permit exhaust of the chamber 22 when the valve stem is positioned within the chamber 22 as shown in FIG. 1. The valve sleeve and the valve stem may be fabricated from any suitable metallic material possessing the property of good wear such as brass coated with chromium, stainless steel and the like.

A gasket means 24, fabricated from any suitable material having good wear and some flexibility such as polytetrafluoroethylene, polyurethane and the like, is carried by the rear extremity of the valve stem 21. A chamfered portion 25 of the valve sleeve 21 serves as part of the seat for the gasket means 24 when the gasket means engages therewith. Engagement of the gasket means 24 with chamfered portion 25 of the valve sleeve causes the gasket means to be slightly compressed and thereby provide a substantially airtight seal so that air may not flow between the gasket means 24 and the chamfered portion 25.

A rearwardly projecting portion 26 of the valve stem 21 serves as the seat for an extremity of bias means 27. The other extremity of the bias means 27 abuts the end wall 70 of the chamber 18. It is seen that the bias means 27 is confined between the valve stem 21 and the end wall 70 of the chamber 18 so as to bias the valve stem away from the end wall of the chamber 18. The bias means 27 may be any suitable compression spring such as a coil spring and the like.

A rounded head 28 may be formed on the exposed extremity of the valve stem 21. The head 29 of the valve stem 21 projects externally of the body section 11 of the airless gun. Immediately behind the head 28 of the valve stem 21 is gasket means 29. The gasket 29 may be an O-ring fabricated from any suitable wear-resistant material such as polytetrafluoroethylene, polyurethane and the like. The O-ring gasket 29 may be seated in a circumferential groove 30 formed in the valve stem 21.

A chamfered portion 31 may be formed in the frontmost extremity of the valve sleeve 20. The chamfered portion 31 may be used to provide a seat for the gasket 29 when the gasket engages therewith. Engagement of the gasket 29 with the chamfered portion 31 causes the gasket 29 to be slightly compressed so as to close the forward portion of the valve chamber 22 in such a manner that air in chamber 22 is unable to escape therefrom around the chamfered portion 31 of the valve sleeve 20.

A trigger 16 of suitable length may be pivotally connected to the body section 11 in any suitable manner such as by a bolt 32 or the like projecting through and retained by the body section as shown in FIG. 1. The bolt connection serves as the axis about which the trigger 16 may pivot. A rearwardly projecting section 33 of the trigger 16 abuts the head portion 28 of the valve stem 21. Pivotal displacement of the trigger 16 toward the head 28 of the valve stem causes projecting section 33 to displace the valve stem in such a manner as to cause the bias means 27 to be compressed and hence to store energy therein.

A fluid-actuated means 34 such as a piston means or the like is carried by the body section 11 of the airless gun. The fluid-actuated means 34 includes a cup-shaped means 35, sealing means 36, bias means 37 and a slidable shaft 38 adjustably connected to the cup-shaped means. The cup-shaped means 35 may include a threaded aperture, the threads of which are in mating engagement with the threads at the extremity of the slidable shaft 38. A washer 39 and nut 40 combination may be used to securely retain flexible seal 36 in a fixed position with respect to the cup-shaped means 35. The flexible washer 39 may be fabricated from suitable material such as polytetrafluoroethylene, polyurethane and the like. The presence of an elevated air pressure adjacent the cup 35, causes the seal 36 to flatten against the sidewalls of the chamber thereby substantially preventing air from flowing therearound. The bias means 37 may be a coil spring or the like positioned in chamber 41 between the washer 39 and the internal extremity of cup-shaped means 42 used to seal the rear of the airless gun. The bias means 37 urges the slidable shaft 38 toward the nozzle section 13 of the airless gun.

A chamber 43 communicates with the cup-shaped means 35 and chamber 22 of the valve sleeve 20 by way of aperture 44 formed in the valve sleeve. It is seen that if the air pressure in the chamber 43 exceeds a determined value due to an airflow thereto from the air source (not shown) through air passageway 17, a force of sufficient magnitude is caused to be exerted against the cup-shaped means 35 which causes the cup-shaped and hence the slidable shaft 38 to be displaced in the direction of arrow 45. Displacement of the cup-shaped means 35 in the direction of arrow 45 compresses the bias means 37 thereby storing energy therein. The exhaust of the accumulated air pressure exerting a force against the cup-shaped means 35 through the slots 23 of valve stem 21 allows the release of the energy stored by the bias means 37. The release of the stored energy of the bias means 37 allows the shaft 38 to return to its original position with respect to the orifice of the nozzle section 13, that is, the position illustrated in FIG. 1.

It is thought that the exhaust of the accumulated air pressure from the airless gun at the front of the valve stem 21 rather than through an aperture in the sidewall of the valve sleeve 20 reduces the number of parts of the valve means such as sealing members and the like.

The portion of the slidable shaft 38 within the body section 11 of the airless gun may be supported and guided therein by guide means 46. The guide means 46 includes a partially threaded outer periphery 47 which is threadly received by a hollow threaded section 48 of the body section 11 to thereby locate and fixedly retain the guide means within the body section. A sealing means 49, such as an O-ring may be used to seal the forward extremity of the guide means 46.

A member 50 of the nozzle section 13 includes a threaded forward end 51 which is threadedly received by the internal threads of annular cap 52. The annular cap 52 includes a circumferential flange 53 which engages with and fixedly retains spray nozzle tip 54. The spray nozzle tip 54 includes an axial bore or orifice 55 through which fluid material may be emitted. The spray nozzle tip 54 includes an insert 56 which may have an axial bore 57 which communicates directly with the orifice 55 of the spray nozzle tip. A surface of conical or spherical shape may be formed in the rear of the axial bore 57 of the insert 56 in order to provide a flared seat 58 for the tapered extremity 59 of the slidable shaft 38. The cooperative relationship between the tapered extremity 59 of the shaft 38 and the seat 58 determines when and how much coating material flows therethrough. Suitable gaskets may be used in the nozzle section 13 to substantially prevent coating material from leaking therefrom. Whenever desired, the spray nozzle tip 54 may be conveniently replaced by a different size tip by removing the annular cap 52 replacing the spray nozzle tip with a spray nozzle tip having the desired orifice opening and replacing the annular cap 52.

The front portion of the slidable shaft 38 may be supported and guided by means 60. A counterbore 61 in the member 50 serves to support the front section of the slidable shaft 38. The shaft 38 projects through a suitable seal 62. A gland nut 63 is threaded into the rear end of member 50 to retain the seal 62 in position. As illustrated in FIG. 1, the slidable shaft 38 extends rearwardly past the trigger 16, through the bore 64 of the guide means 46 and into the chamber 43. The slidable shaft 38 may be adjustably connected to the cuplike means 35.

The tapered front extremity 59 of the slidable shaft 38 is biased or positioned against the seat 58 formed in the insert 56 thereby closing or blocking the orifice therein when the gun is deactuated. However, when the trigger 16 is displaced rearwardly by the operator, the slidable shaft 38 and its tapered extremity 59 are likewise moved rearwardly away from the seat 58 thereby permitting coating material, under high pressure to flow from a source of coating material through inlet port 71 of member 50 and out the orifice 55 at a high velocity. The coating material is atomized and deposited onto the article to be coated.

Figure 3:
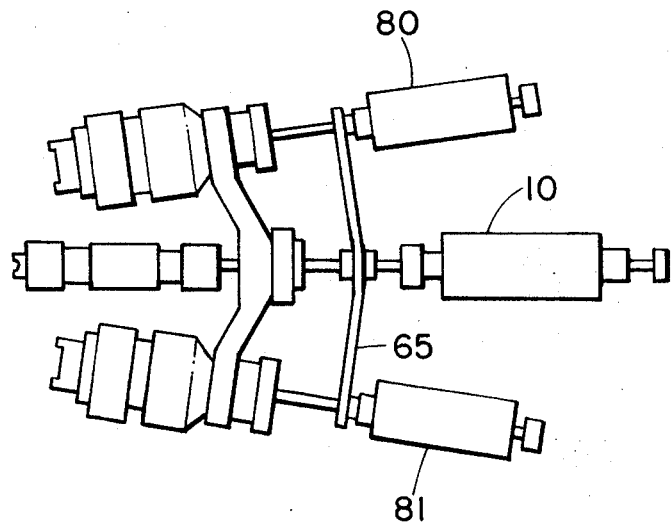
FIG. 3 is a top view of a tandem connection of a plurality of airless spray guns, the center spray gun using the air-assisted trigger means of the present invention.

A bar extension 65 may be fixedly connected to the slidable shaft 38 by any suitable means such as by welding, brazing, soldering and the like. The bar extension 64 may be used to operate the triggers associated with the spray guns 80 and 81 positioned on either side of the airless spray gun 10 as shown in FIG. 3. It is seen that actuation of trigger 16 of the airless spray gun 10 and hence shaft 38 causes a like displacement of the shafts of each of the guns located on either side of the airless gun 10. If the slidable shaft 38 is operated directly by trigger as is the case with several prior art devices, a high pull force be exerted by the operator, that is about 15 pounds of pull force per gun. Furthermore, if the operator pulls the trigger slightly askew one of the guns at the side of airless gun 10 may emit coating material before the other guns do thereby wasting the coating material.

The three-gun arrangement shown in FIG. 3 may be used for spray depositing of plastics which require a chemical reaction between three or more chemical components. U.S. Pat. No. 3,399,834 gives a detailed analysis of the three-gun arrangement of FIG. 3 and examples of chemicals which may be sprayed from each of the three guns 10, 80 and 81.

Having thus described the physical relationship of the various components of the airless gun, the functional cooperation thereof will be described hereinafter.

In operation, pivotal displacement of the trigger 16 toward the handle section 15 of the airless gun causes displacement of the gasket means 24 and the gasket means 29. The gasket means 29 engages with chamfered portion 31 at the forward portion of the valve sleeve 20 sealing the forward portion of the valve sleeve so that air in the chamber 22 of the valve sleeve may not pass between the gasket means 29 and the chamfered portion 31. At about the same time the gasket means 29 engages with the chamfered portion 31 of the valve sleeve 22, the gasket means 24 disengages with the chamfered portion 25 at the rear of the valve sleeve thereby allowing air from an air source (not shown) to flow from the air source through the air passage entry 17 to the valve chamber 22 of the valve sleeve. It is seen that the airflow may not flow between gasket means 29 and chamfered portion 31 out of the valve chamber 22 of the valve sleeve since the forward extremity of the chamber 22 is sealed by the cooperative relationship existing between gasket means 29 and chamfered portion 31.

The airflow from the air source (not shown) proceeds from the chamber 22 through the aperture 44 in the valve sleeve 20 and through aperture 65 formed in the guide means 46 to chamber 43. The substantially instantaneous accumulation of air pressure in the chamber 43 causes a force to be exerted against the cup-shaped means 35 of the fluid-actuated means. The force exerted by the accumulation of air pressure in the chamber 43 against the cup-shaped means 35 of the fluid-actuated means is sufficient to cause rapid displacement of the fluid-actuated means in the direction of arrow 45. Displacement of the fluid-actuated means in the direction of arrow 45 causes withdrawal of the tapered extremity 59 of the slidable shaft 38 from a closed position with the seat 58 of the nozzle portion 13 of the airless gun and compression of and hence the storage of energy in bias means 37. It is seen that the force required to be exerted by an operator to initiate operation of the airless gun is proportional to the force required to displace bias means 27 which is less than the force required to compress the bias means 37 of the fluid-actuated means. The application of the force required to displace the slidable shaft 38 is substantially instantaneous upon disengagement of gasket means 24 with the chamfered portion 25 of the valve sleeve 20 regardless of the gradual nature of the application of force to the trigger 16 by the operator thereby substantially eliminating the possibility of obtaining an undesirable spray pattern during the initial phase of the spraying operation. It is thought that the actuation of the valve means 19 causes the shaft 39 to be displaced from about 5 to about 10 times faster than realizable with the more conventional method of manually biasing bias means 37.

The release of operator pressure on the trigger 16 causes the release of the energy stored by the bias means 37 during the displacement of the trigger away from the handle portion 15. The gasket means 29 disengages with chamfered portion 31 allowing the accumulated air pressure in air passageway 43 to exhausted by way of the plurality of slots 23 formed in the valve stem 21. At about the same time, the gasket means 24 engages with chamfered portion 25 thereby substantially preventing a further flow of air from the air source (not shown) through the air passageway 17 to the chamber 22 of the valve means 19. The exhaust of accumulated air pressure from the air passageway 43 allows the energy stored by bias means 37 to be released thereby causing displacement of the slidable shaft 38 so that the tapered extremity 59 of the slidable shaft engages with the seat 58 and closes the orifice 55 of the nozzle portion 13. It is seen that the closure of the nozzle orifice by the tapered extremity 59 of the slidable shaft 38 is independent of the gradual nature of the release of force applied to the trigger 16 by the operator thereby substantially eliminating the possibility of obtaining an undesirable spray pattern during the terminal phase of the spraying operation.

It is recognized that the valve means 19 may be used with airless electrostatic spray guns.

The present invention is not intended to be limited to the disclosure herein, and changes and modifications may be made by those skilled in the art without departing from the spirit and scope of the present invention. Such modifications are considered to be within the purview and scope of the present invention and the appended claims.

Having thus described my invention, I claim:

1. A valve assembly for a spray gun having a nozzle for dispensing coating material, means including a shaft adapted to control the flow of coating material from the nozzle, a fluid-actuated means adapted to displace the shaft, the valve assembly adapted to be connected to the fluid-actuated means for controlling the flow of fluid to the fluid-actuated means, the valve assembly including an open-ended valve sleeve, a slotted valve stem movable in the valve sleeve, the valve stem adapted to engage with either one or the other of the ends of the valve sleeve to close that end of the valve sleeve while the other end of the sleeve is open thereby either connecting a fluid source to the fluid-actuated means through the open end of the valve sleeve to the fluid-actuated means causing displacement of the shaft so as to allow coating material to flow from the nozzle or disconnecting the fluid source from the fluid-actuated means and allowing fluid in the fluid-actuated means to exhaust therefrom between the valve sleeve and the slot of the valve stem out the open end of the valve to the atmosphere causing displacement of the shaft terminating the flow of coating material from the coating material source.

2. The valve assembly of claim 1, wherein the valve stem includes gasket means adapted to engage with the open end of the valve sleeve to thereby close that end of the valve sleeve.

3. The valve assembly of claim 2, wherein the gasket means are located at opposite ends of the valve stem, the gasket means spaced apart so that one gasket means engages with the open end of the sleeve at about the time the other gasket means disengages with the other end of the sleeve to thereby open that end of the sleeve.

4. The valve assembly of claim 1, wherein the valve stem is biased by a bias means cooperatively associated therewith.

5. A spray gun including the valve assembly of claim 1, wherein the valve assembly causes actuation of spray devices on either side of the spray gun.